Feb. 3, 1925.

F. OLSON

COMBINED BAIT AND TACKLE BOX

Filed Dec. 27, 1923  2 Sheets-Sheet 1

1,525,195

Inventor
Frederick Olson
By Frank Sahnleman
Attorney

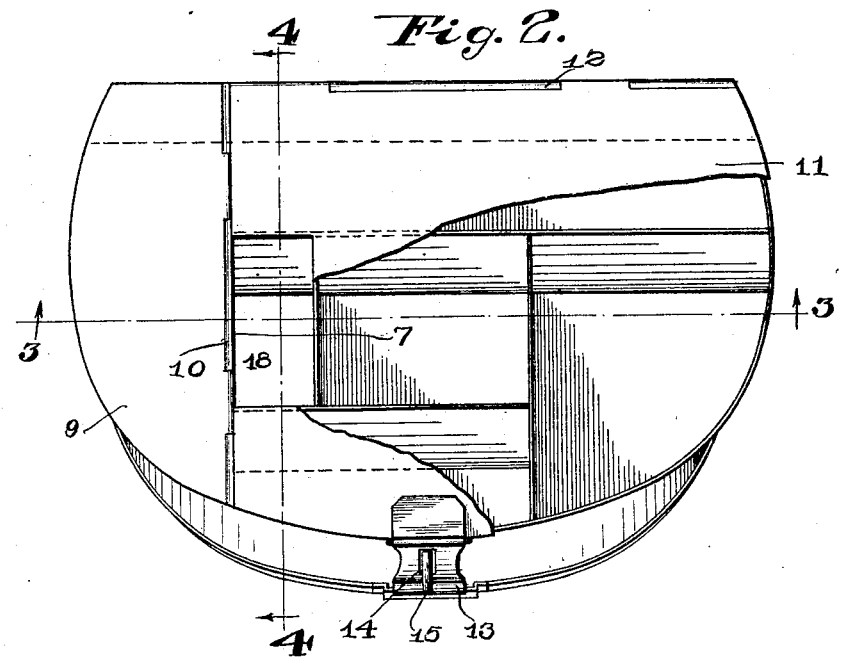
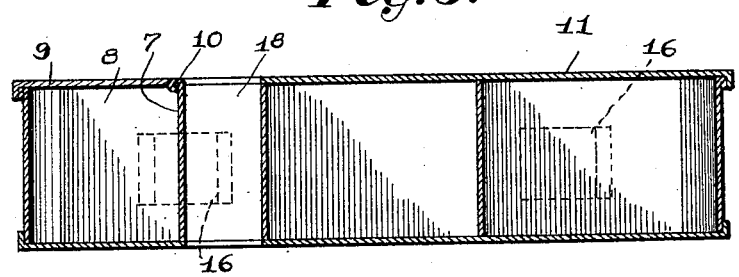
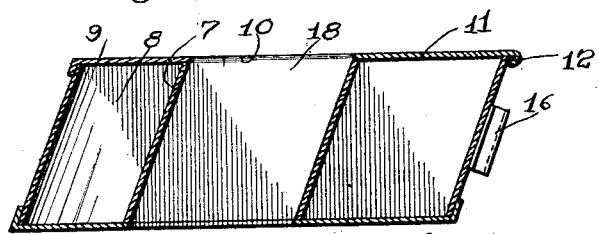

Patented Feb. 3, 1925.

1,525,195

UNITED STATES PATENT OFFICE.

FREDERICK OLSON, OF PROVO, UTAH.

COMBINED BAIT AND TACKLE BOX.

Application filed December 27, 1923. Serial No. 683,029.

*To all whom it may concern:*

Be it known that I, FREDERICK OLSON, a citizen of the United States of America, and resident of Provo, in the county of Utah and State of Utah, have invented certain new and useful Improvements in Combined Bait and Tackle Boxes, of which the following is a specification.

This invention relates to a combined tackle and bait box constituting an attachment for creels.

It is an object of this invention to produce a combined tackle and bait box adapted to be associated with creels of ordinary construction wherein the said box may be carried on the lid of the creel without interfering with the free movement of the lid, within predetermined bounds, or interfering with the insertion of the fish through the usual opening in the lid of the creel.

It is a further object of this invention to produce a combined tackle and bait box having novel means for its attachment to the sling by which the creel is carried, and it is held in place on the lid of the creel in the manner heretofore stated in order that a fisherman may have bait conveniently located without interfering with the usual functions of the creel to which the box is applied.

It is a further object of this invention to produce a bait and tackle box having independent covers in order that bait may be accessible without disturbing the cover of the tackle compartment, the said box also having a hole or passage therethrough adapted to register with the opening in the lid of a creel to permit the catch to be inserted in the creel without disturbing the box.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 2 illustrates a plan view of a combined tackle and bait box with the lid of the tackle compartment broken away to disclose its interior;

Figure 3 illustrates a sectional view on the line 3—3 of Fig. 2; and

Figure 4 illustrates a sectional view on the line 4—4 of Fig. 2.

Figure 1:
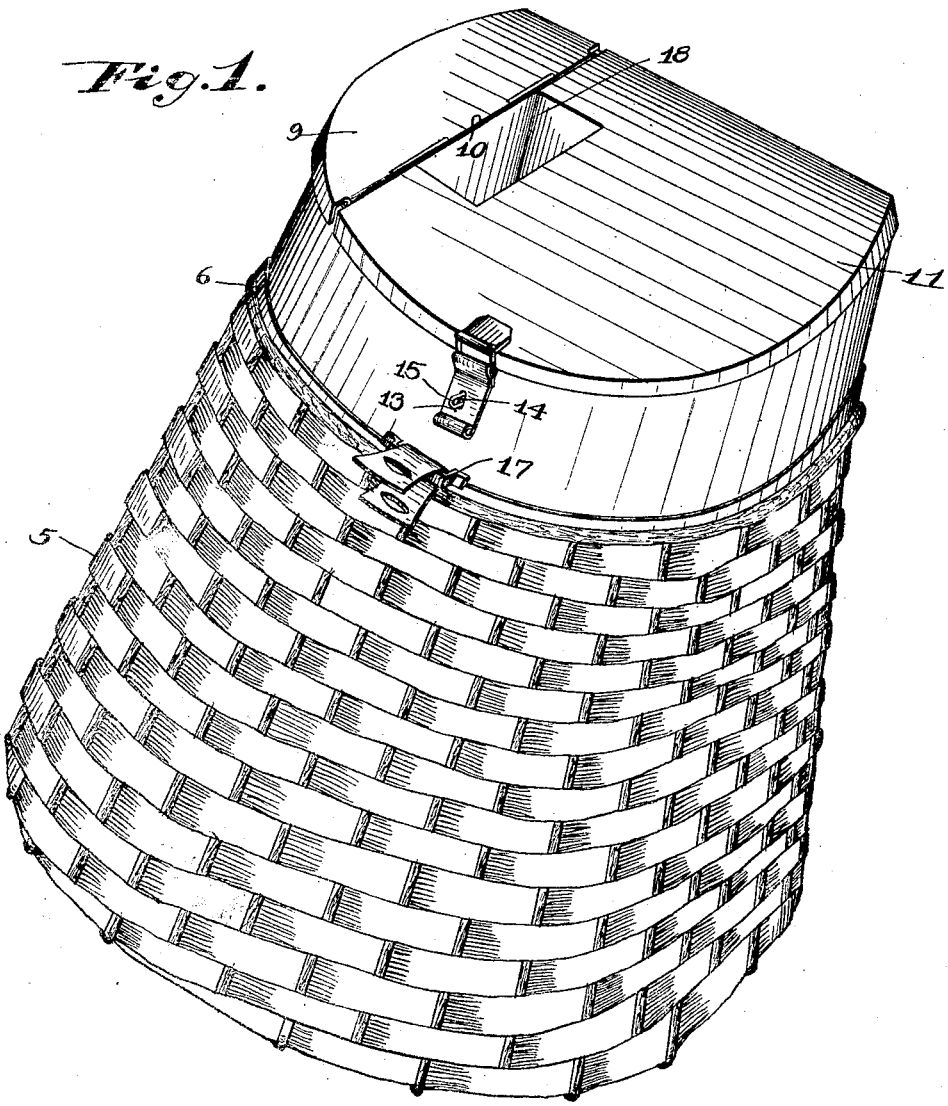
Figure 1 illustrates a perspective view of a creel showing a combined tackle and bait box embodying the invention applied thereto.

In these drawings 5 denotes a conventional form of creel having a lid or cover 6, it being understood that the said cover shall be provided with the usual opening through which fish are inserted in the basket.

The combined tackle and bait box has an external side configuration conforming to the contour of a creel, the side thereof to be applied adjacent the body of the user being straight, whereas the other side is curved to conform to the configuration of the creel. Of course the combination box will be made in sizes proportionate to the sizes of the creels now commonly employed, and the inventor does not wish to be limited with respect to this feature of the device. The casing has a transversely disposed partition 7 near one end that serves to produce a compartment 8 of a size that will suffice for a supply of bait, and a cover or lid 9 is mounted on a pivot 10 and is operative to close the bait compartment.

The cover or lid 11 for the tackle compartment is hinged at its rear edge as at 12 and it may be provided with any suitable hasp or retaining device 13 at its outer edge. As here shown the hasp has an aperture 14 to receive a looped stud 15, it being understood that the stud will be anchored to the side of the box.

The outer surface of that side of the box that is adjacent to the user has loops or guides 16 through which the straps of a creel sling may be inserted for the purpose of retaining the box on the lid of the creel, and with this arrangement, the creel and box can be carried conveniently and the box will be retained in proper position on the creel. The front of the box is also provided with a bar 17 anchored thereto and having a portion clear of the surface of the box through which a flexible member may be inserted for the purpose of fastening the front part of the box to the creel.

The partitions are so arranged as to form an opening or clearance 18 that will aline or register with an opening in the creel cover or lid, and as creels are usually made universal with respect to the opening in the lid, little difficulty will be encountered in manufacturing the device embodying the invention in order that it may be used in association with creels of conventional type.

I claim:

In a combined bait and tackle box, a casing having partitions dividing the interior into compartments, a lid for one of the compartments, a lid on the casing covering a plurality of compartments, the last mentioned lid having an opening corresponding to the size of and alining with one of the compartments, and the bottom of the casing having an opening to the said compartment and adapted to aline with an opening in the lid of a creel, and means for holding the box on a creel.

FREDERICK OLSON.